United States Patent

Hutchinson

[15] 3,700,752

[45] Oct. 24, 1972

[54] GEL POLYMERIZED POLYURETHANE PRECURSORS AND VINYL MONOMERS

[72] Inventor: Francis Gowland Hutchinson, Runcorn, England

[73] Assignee: Imperial Chemical Industries Limited, London, England

[22] Filed: Jan. 13, 1970

[21] Appl. No.: 2,641

[30] Foreign Application Priority Data

Jan. 27, 1969  Great Britain............4,446/69

[52] U.S. Cl.........260/859 R, 260/2.5 A, 260/37 AL, 260/37 N, 260/41 R, 260/41 AG, 260/75 TN, 269/75 NE, 260/77.5 CR
[51] Int. Cl. .............................................C08g 41/04
[58] Field of Search......................................260/859

[56] References Cited

UNITED STATES PATENTS

| | | | |
|---|---|---|---|
| 2,806,836 | 9/1957 | Nischk | 260/859 |
| 2,879,248 | 3/1959 | Nischk | 260/859 |
| 3,008,917 | 11/1961 | Park | 260/859 |
| 3,047,530 | 7/1962 | Nischk | 260/859 |
| 3,509,234 | 4/1970 | Burlant | 260/859 |

FOREIGN PATENTS OR APPLICATIONS

| | | | |
|---|---|---|---|
| 956,720 | 1/1957 | Germany | 260/859 |
| 1,158,602 | 6/1958 | France | 260/859 |
| 971,199 | 12/1958 | Germany | 260/859 |
| 1,073,135 | 1/1960 | Germany | 260/859 |
| 1,126,602 | 3/1962 | Germany | 260/859 |
| 3,925,195 | 11/1962 | Japan | 260/859 |

*Primary Examiner*—Paul Lieberman
*Attorney*—Cushman, Darby & Cushman

[57] ABSTRACT

A process for the preparation of shaped polymeric articles by gel-polymerizing a homogeneous composition comprising from 5 to 95% by weight of the precursors of a cross-linked polyurethane and from 95 to 5% by weight of at least one vinyl monomer in which the gelatin of the polyurethane is substantially completed before polymerization of the vinyl monomer is allowed to proceed to the extent that the vinyl polymer so produced forms a separate phase, and thereafter completing polymerization of the vinyl monomer; also shaped polymeric articles comprising a homogeneous dispersion of from 5 to 95% by weight of a cross-linked polyurethane and from 95 to 5% by weight of a polymer of at least one vinyl monomer.

36 Claims, No Drawings

GEL POLYMERIZED POLYURETHANE PRECURSORS AND VINYL MONOMERS

This invention relates to shaped polymeric articles and to a method of producing shaped polymeric articles from a composition comprising at least one vinyl monomer and the precursors of a cross-linked polyurethane.

The conditions under which cross-linked polyurethanes may be prepared by reacting a polyfunctional isocyanate with a polyfunctional compound containing groups which are reactive with isocyanate groups, e.g. hydroxyl, carboxyl or amine groups, are well known in the art. For example, a cross-linked polyurethane may be prepared by gelation of suitable proportions of such a polyfunctional compound and a polyisocyanate, the functionality of at least one of the components being greater than two. Alternatively, a prepolymer may be prepared by reacting such a polyfunctional compound with a polyisocyanate to produce an isocyanate-terminated prepolymer. The prepolymer may, if desired, be chain-extended and may be cross-linked, for example, by further reaction with a further polyfunctional compound containing groups reactive with isocyanate groups. Other methods of preparing cross-linked polyurethanes will be apparent to those versed in the art.

It has also been proposed to produce shaped articles from a composition comprising a vinyl monomer and the precursors of a cross-linked polyurethane by simultaneously polymerizing the vinyl monomer and forming, or gelling the cross-linked polyurethane, while subjecting the composition to a shaping step. However, this procedure suffers from the disadvantage that it may lead to phase separation between the resultant cross-linked polyurethane and the vinyl polymer in the shaped article, particularly at high concentrations of vinyl monomer, with a consequent adverse effect on the mechanical properties.

We have now discovered a process in which the aforementioned disadvantage may be substantially avoided, and which results in the production of polymeric shaped articles having in many cases, improved properties, e.g. higher initial moduli and impact strength, than the corresponding properties of articles produced by the hitherto known process of simultaneously polymerizing the vinyl monomer and gelling the precursors of the cross-linked polyurethane. We have also found that by appropriate choice of the vinyl monomer and the precursors of the cross-linked polyurethane, shaped articles of high clarity may be propduced by the process of the present invention, and in particular, articles having much improved clarity over articles prepared by the hitherto known process.

According to the present invention we provide a process for the preparation of a shaped polymeric article by gel-polymerizing a homogeneous composition comprising at least one vinyl monomer and the precursors of a cross-linked polyurethane and shaping the composition at a stage when it is still fluid, in which the composition comprises from 5 to 95 percent by weight of cross-linked polyurethane precursors free of groups copolymerizable with vinyl monomer and from 95 to 5 percent by weight of at least one vinyl monomer, and the gelation of the polyurethane is substantially completed before polymerization of the vinyl monomer is allowed to proceed to the extent that the vinyl polymer so produced forms a separate phase, and thereafter polymerization of the vinyl monomer is completed.

By vinyl monomer we mean a monomer which contains terminal ethylenic carbon-carbon unsaturation and which is polymerizable and/or copolymerizable by free-radicals.

Products produced by our process may be identified by examination of a thin section by electron microscopy. Osmium tetroxide staining is a useful way of identifying the polyurethane phase. If the process has been allowed to proceed in such a way that a "separate phase" is formed, separate regions of polyurethane and vinyl polymer will be detectable, with polyurethane regions having dimensions of at least 0.5 $\mu$, commonly greater than 40 $\mu$. Further, the vinyl polymer may also form regions having dimensions greater than 40 $\mu$. However, if the process has been carried out correctly, the product is characterized by the appearance of domains of vinyl polymer having dimensions not greater than 10 $\mu$ preferably not greater than $\mu$, and desirably not greater than 2 $\mu$. These domains are separated by regions composed of polyurethane not greater than 1,000 A thick, usually of the order of a few hundred Angstrom units thick. Although in the two dimensional view obtained by electron microscopy the domains appear to be separate particles, they do in fact have continuity through the body of the material.

If the material are examined in section by optical microscopy, satisfactory products appear to be homogeneous, since the polyurethane regions are so thin that they cannot be resolved, and the vinyl polymer domains are not apparently separate. Unsatisfactory materials, in which phase separation has occurred may, however, be identified as such, by optical microscopy since the polyurethane and vinyl polymer phases are usually observed to be separate.

In many cases, particularly where the products prepared by our process are transparent, operation according to prior art processes gives products in which separate phases are present which are visible to the naked eye. This may even be the case when the products are opaque.

The precursors of the cross-linked polyurethane may comprise, for example, at least one polyfunctional compound containing groups reactive with isocyanate groups and at least one polyisocyanate. The precursors may, if desired, comprise a reaction product of the polyfunctional compound and the polyisocyanate, for example, an isocyanate-terminated prepolymer, together with at least one other component capable of cross-linking the prepolymer. Alternatively, the reaction product may be, for example, a partially gelled polyurethane formed from at least one polyfunctional compound and at least one polyisocyanate with the proviso that the gelation reaction of the partially gelled polyurethane has not proceeded to such an extent that it can no longer be mixed with the vinyl monomer to form a homogeneous composition.

The process of formation of the shaped polymeric article is herein referred to as gel-polymerization, the process of formation of the cross-linked polyurethane from the precursors therefor as gelation, and the process of formation of the vinyl polymer as polymerization.

We have found that where the composition comprises from 5 to 60% by weight of cross-linked polyurethane precursors and from 95 to 40% by weight of at least one vinyl monomer our process shows particular advantages over the hitherto known process or simultaneously polymerizing the vinyl monomer and gelling the polyurethane precursors. In the latter process there is, in general, in this composition range, considerable phase separation in the products with consequent adverse effect on the properties thereof.

It is particularly preferred to use from 10 to 50% and especially 10 to 30% by weight of cross-linked polyurethane precursors and from 90 to 50%, and especially 90 to 70% by weight of at least one vinyl monomer in the composition. Such compositions permit the production of shaped articles showing a substantial improvement in tensile properties, e.g. initial modulus, and impact strength, over the properties of shaped articles prepared by the hitherto known process. Indeed, in the latter process considerable phase separation may take place between the resulting cross-linked polyurethane and the vinyl polymer in these composition ranges resulting in, in extreme cases, separation into two layers.

We have also found that the molar proportion of the groups in the polyfunctional compound which are reactive with isocyanate groups to the isocyanate groups in the polyisocyanate which are used in the composition has an effect on the properties of the product, and in particular on the impact strength thereof. For a given proportion of cross-linked polyurethane precursors to vinyl monomer used in the process it is preferred that the aforementioned molar ratio be in the range 0.8:1 to 1:1.1 and more preferably 0.8:1 to 1:1 where products having optimum impact strength are desired.

In the process of our invention it is particularly important that the vinyl monomer, and any vinyl polymer which may be formed during the gelation of the cross-linked polyurethane remains substantially in solution in the gel and to this end it is preferred that the vinyl monomer should remain substantially unpolymerized until the gelation of the polyurethane is substantially complete. If a substantial amount of vinyl polymer is formed before the gelation of the polyurethane is complete, the vinyl polymer may form a separate phase in the gel, and in an extreme case may form a separate layer, with consequent adverse effect on the properties of the product.

In order that the presence of an undesirably large amount of vinyl polymer may be avoided before gelation of the polyurethane is substantially complete it is preferred that the vinyl monomer which is used in the process is freed of traces of polymer, e.g. by distillation, shortly before use in the process.

The amount of vinyl polymer which can be tolerated before gelation of the polyurethane is substantially complete without resulting in visible phase separation depends on a number of factors including the nature of the polyurethane and on its degree of cross-linking, and on the nature of and the molecular weight of the vinyl polymer which may be present. For example, for a vinyl polymer of a given molecular weight the amount thereof which can be tolerated without phase separation decreases as the degree of cross-linking of the polyurethane increases, and for a given polyurethane the amount of vinyl polymer which can be tolerated without phase separation decreases with increase in the molecular weight of the vinyl polymer which may be present. The amount of vinyl polymer which can be tolerated in a particular composition before the gelation of the polyurethane is substantially complete may be determined by means of simple experiment and by reference to the examples set out in this specification.

In order that the possibility of phase separation due to formation of vinyl polymer during gelation of the polyurethane may be decreased it is preferred that the gelation of the polyurethane be effected as rapidly as possible. In general, the gelation of the polyurethane will be more rapid where the polyurethane precursors are of high functionality, although it must be understood that the degree of cross-linking of the gelled polyurethane, which increases with the functionality of the components, may also have an effect on the properties of the resultant shaped article, as hereinafter discussed.

The precursors of the cross-linked polyurethanes may comprise an isocyanate-terminated prepolymer and at least one other component capable of cross-linking the prepolymer. The prepolymer may be formed e.g. by reaction of a compound containing groups which are reactive with isocyanate groups and at least a molar excess of polyisocyanate. In order that the time required for gelation of the polyurethane while the latter is in contact with the vinyl monomer may be decreased, the prepolymer is preferably formed before contacting with the vinyl monomer. It is preferred that the cross-linking agent which is to be reacted with the isocyanate-terminated prepolymer be such as to result in rapid gelation.

Catalysts which increase the rate of polyurethane gelation may be used, e.g. tertiary amines or stannous octate. Particularly effective catalysts are dibutyl tin dilaurate or a mixture thereof with a tertiary amine. The time which is required to achieve substantially complete gelation of the polyurethane precursors depends on a number of factors, for example, on the nature of the polyurethane precursors and on the proportion of polyurethane precursors and vinyl monomer in the composition to be used in the process.

Thus, for example, times required to achieve substantially complete gelation increase as the proportion of polyurethane precursors in the composition decreases and for constant relative proportions of polyurethane precursors and vinyl monomer in the composition the gelation time decreases as the functionality of the polyurethane precursors increases.

The use of an aromatic polyisocyanate as a component of the polyurethane precursors results in a shorter gelation time than does the use of an aliphatic polyisocyanate, and polyisocyanates containing primary aliphatic isocyanate groups result in shorter gelation times than does the use of aliphatic polyisocyanates containing secondary or tertiary isocyanate groups.

Gelation times required for polyurethane precursors containing a polyfunctional compound containing amino, hydroxyl or carboxyl groups generally increase in the order amino to hydroxyl to carboxyl, and polyfunctional compounds containing primary hydroxyl groups generally require shorter gelation times than polyfunctional compounds containing secondary or tertiary hydroxyl groups.

We have also found that gelation times vary to some extent with the nature of the vinyl monomer used in the process, for example, we have found that for constant relative proportions of polyurethane precursors and vinyl monomer the gelation times required are shorter where the vinyl monomer is methyl methacrylate than where the vinyl monomer is acrylonitrile.

In general, where gelation of the polyurethane is substantially complete the composition containing cross-linked polyurethane and vinyl monomer does not flow (at high concentrations of cross-linked polyurethane) or flows only very slowly (at low concentrations of cross-linked polyurethane).

Gelation times required may be determined by means of simple experiment and by reference to the Examples in this specification.

Thus, for example, we have found that where the polyurethane precursors comprise 4:4'-diphenylmethane diisocyanate and equal proportions by weight of poly(propylene glycol) of molecular weight approximately 2,000 and oxypropylated trimethylol propane of molecular weight approximately 3,000 and the vinyl monomer is methyl methacrylate times required to achieve substantially complete gelation vary between ¾ hour and 1½ hours where the proportion of polyurethane precursors varies between 60 and 40% by weight and the proportion of vinyl monomer between 40 and 60% by weight. The times suggested are usually sufficient, but in the Examples which follow, longer times are often used, as there is no disadvantage in doing so, other than the extended process time. On the other hand, where the polyurethane precursors comprise an isocyanate-terminated prepolymer formed from poly(propylene glycol), oxypropylated trimethylol propane and isophorone diisocyanate and the vinyl monomer is methyl methacrylate, a gelation time of 1 minute or even less may be achieved using butane-1:4-diamine as a cross-linking agent, even where the composition comprises only 10% by weight of polyurethane precursors and 90% by weight of vinyl monomer.

As in general it can be arranged for polyurethane precursors to be gelled at ambient temperature and for vinyl monomers to remain unreactive at these temperatures but to be polymerized at elevated temperature, the process is most easily effected by suitable adjustment of the temperature throughout the reaction. Thus, it is preferred to effect the gel-polymerization by gelling the precursors of the cross-linked polyurethane and thereafter polymerizing the vinyl monomer at a temperature higher than that at which the gelation of the precursors is effected.

It is particularly preferred to arrange the nature of the composition so that the gelation of the polyurethane is effected at about or below ambient temperature, e.g. at or below 30° C, and that the vinyl monomer is polymerized only at elevated temperatures, e.g. at a temperature of 40° C or higher, preferably 50° C or higher and more preferably between 50° and 100° C.

If desired, a polymerization inhibitor may be included in the composition to reduce the amount of, or delay the onset of, polymerization of the vinyl monomer during gelation of the polyurethane, particularly if gelation is effected above ambient temperature.

The vinyl monomer may be polymerized by thermal and/or chemical action, and it will generally be preferred or even necessary that a polymerization initiator be used. The temperature at which it is to be polymerized and the nature of the initiator to be used depend on the vinyl monomer.

It is preferred that the vinyl monomer be polymerized initially at a temperature substantially below the boiling point of the vinyl monomer, e.g. at a temperature of 20° C or more below the boiling point otherwise undesirable voids may be formed in the product.

Suitable initiators include, for example, di-tertiary-butyl-peroxide and azobisisobutyronitrile where the vinyl monomer is to be polymerized at elevated temperature. If desired, a suitable combination of inhibitor and initiator may be chosen so that the polymerization of the vinyl monomer may be effected at the temperature at which the polyurethane precursors are gelled, e.g. at ambient temperature or even at higher temperature.

As hereinbefore discussed the polyurethane precursors may comprise, for example, a reaction product of at least one polyfunctional compound containing groups reactive with isocyanate groups and at least one polyisocyanate, e.g. a partially gelled polyurethane formed therefrom. We have found that, in certain circumstances, it may be advantageous to use such a partially gelled polyurethane as the precursor. Thus, for example, where the composition used in the process of our invention comprises a high proportion of at least one vinyl monomer and a low proportion of cross-linked polyurethane precursors, e.g. from 5 to 20% by weight of cross-linked polyurethane precursors and from 95 to 80% by weight of at least one vinyl monomer, the time required to gel the polyurethane when the precursors in the composition comprise at least one polyfunctional compound and at least one polyisocyanate may be inconveniently long, and at low proportions of cross-linked polyurethane precursors within the above range, gelation may, in certain circumstances, not be possible. Success in achieving gelation and/or in reducing the gelation time may be achieved in this case by using a partially gelled polyurethane as the precursor, and in a further embodiment of our invention we provide a process according to the present invention which comprises gelling the precursors of a cross-linked polyurethane alone, or in admixture with at least one vinyl monomer, during the gelation of the polyurethane and before the completion thereof adding at least one vinyl monomer, or adding further increments of at least one vinyl monomer, to form a homogeneous composition, thereafter substantially completing the gelation of the cross-linked polyurethane precursors before polymerization of the vinyl monomer is allowed to proceed to the extent that the vinyl polymer so produced forms a separate phase, and thereafter completing the polymerization of the vinyl monomer.

We have found that in effecting the process of our invention in accordance with the above described embodiment it is convenient to effect the process by starting with a homogeneous composition of, for example, approximately equal proportions by weight of polyurethane precursors and at least one vinyl monomer, and after the gelation reaction has started, to add to the composition further increments of at least one vinyl monomer as the gelation reaction proceeds until the desired composition is achieved. It is, of course, necessary that the gelation reaction should not have proceeded to such an extent that the vinyl monomer can no longer be mixed with the partially gelled polyurethane to form a homogeneous composition.

The composition should be shaped before the gelation of the polyurethane and the polymerization of the vinyl monomer have proceeded to such an extent that the composition is no longer sufficiently fluid for it to be shaped. Thus, the composition may be shaped during the process of gelation of the polyurethane. Alternatively, if convenient, the gelation of the polyurethane may be substantially completed and the composition may be subjected to a shaping step during the polymerization of the vinyl monomer. Suitable shaping methods include casting into a mould and compression moulding.

We find that it is convenient to remove air from the composition while it is still fluid, e.g. by connecting the composition to a source of vacuum, in order that the possibility of forming bubbles or voids in the resultant shaped articles may be decreased or avoided.

The properties of the products of the process of our invention will depend on the nature of the polyurethane precursors which are used, the nature of the vinyl monomer or monomers from which the vinyl polymer is derived, the relative proportions of the two in the composition, and the degree of cross-linking of the polyurethane which is produced.

In order to produce products having optimum impact strength it is preferred to choose polyurethane precursors which will form an elastomeric polyurethane after gelation. In a shaped polymeric article having constant amounts of polyurethane and vinyl polymer cross-link densities that are either too great or too small may result in a falling off of impact strength as the polyurethane may not be sufficiently elastomeric.

For optimum impact strength in the products of our process we prefer to choose polyurethane precursors for use in the process which are of a functionality such that, in theory, a cross-linked polyurethane will be formed after gelation having a ratio of molecular weight of the polyurethane to branch points in the range 2,500:1 to 8,000:1, and more preferably in the range 4,000:1 to 8,000:1.

Thus, for example, where the polyurethane precursors comprise a diisocyanate and equal proportions by weight of a difunctional compound of molecular weight 2,000 and a trifunctional compound of molecular weight 3,000 the theoretical ratio of molecular weight of the polyurethane to branch points is 6,000:1.

In practice, however, when the polyurethane precursors are gelled in the presence of at least one vinyl monomer the ratio of molecular weight of the polyurethane to branch points is less than that which would be produced in the absence of the vinyl monomer. For example, we have found that where the proportion of polyurethane precursors to vinyl monomer in the above example is 20:80% by weight the ratio of molecular weight of the polyurethane to branch points in the resultant gel polymerizate may be in the range 30,000 to 60,000:1.

Examples of vinyl monomers suitable for use in the process of our invention include, for example, vinyl esters, aryl vinyl compounds, vinyl nitriles, and vinyl halides. Suitable vinyl esters include, for example, vinyl acetate and esters of acrylic acid having the formula $CH_2=CH-COOR$, where R is an alkyl, aryl, alkaryl, aralkyl or cycloalkyl groups. For example, R may be an alkyl group having from one to 20, and preferably one to 10 carbon atoms. Particular vinyl esters which may be mentioned include, for example, methyl acrylate, ethyl acrylate, n- and iso-propyl acrylates, n-, iso-, and tertiary-butyl acrylates, and longer chain alkyl acrylates, e.g. nonyl, decyl, cetyl and lauryl acrylates.

Other suitable vinyl esters include, for example, esters of formula $CH_2=C(R')COOR$, where $R'$ may be an alkyl, aryl, alkaryl, aralkyl or cycloalkyl group. In the ester of formula $CH_2=C(R')COOR$, R and $R'$ may be the same or different. Particular vinyl esters which may be mentioned include, for example, methyl methacrylate, ethyl methacrylate, n- and isopropyl methacrylate, n-, iso- and tertiary-butyl methacrylate, and longer chain alkyl methacrylates, e.g. nonyl, decyl, cetyl and lauryl methacrylates.

Aromatic vinyl compounds which may be mentioned include, for example, styrene and derivatives thereof, e.g. α-alkyl derivatives of styrene, e.g. α-methyl styrene.

Suitable vinyl nitriles include, for example, acrylonitrile and derivatives thereof, e.g. methacrylonitrile.

Vinyl halides may also be used in the process of our invention, for example, vinyl chloride and vinyl bromide.

The process of our invention is not limited to use with monofunctional vinyl monomers. Polyfunctional vinyl monomers, that is, monomers containing two or more vinyl groups may be used, if desired. Suitable monomers include, for example, glycol dimethacrylate and divinyl benzene. The use of such polyfunctional vinyl monomers will lead to the production of a cross-linked vinyl polymer in the shaped polymeric article.

Although it may be preferred to use a single vinyl monomer, it is to be understood that vinyl copolymers may be obtained by including a plurality of vinyl monomers in the composition to be used in the process of our invention. In particular, where a polyfunctional monomer or monomers is present in the composition it is preferred that they be used in admixture with a monofunctional vinyl monomer or monomers if an unduly high degree of cross-linking in the vinyl polymer is to be avoided. It is preferred that the polyfunctional vinyl monomer or monomers be present in the composition in an amount up to 20% by weight, and more preferably between 1 and 5% by weight, of the monofunctional vinyl monomer or monomers.

The polyurethane precursor components for use in the process of our invention may comprise at least one polyfunctional compound containing groups which are reactive with isocyanate groups and at least one polyisocyanate, at least one of the components having a functionality greater than two, or reaction products thereof, e.g. an isocyanate terminated prepolymer and at least one other component capable of cross-linking the prepolymer, or a partially gelled polyurethane.

Thus, the polyisocyanate may be difunctional or trifunctional or of even higher functionality. The polyisocyanate may be aliphatic, cycloaliphatic or aromatic or may contain in the same polyisocyanate molecule aliphatic and aromatic isocyanate groups, aliphatic and cyclo-aliphatic isocyanate groups, cycloaliphatic and aromatic isocyanate groups, or even aliphatic cycloaliphatic and aromatic isocyanate groups. If desired mixtures of two or more different polyisocyanates may be used.

Examples of suitable polyisocyanates include 4:4'-diphenylmethane diisocyanate, 2:4- and 2:6-toluene diisocyanates and mixtures thereof, isophorone diisocyanates (3-isocyanatomethyl-3,5,5-trimethyl-cyclohexyl isocyanate), diisocyanates of the structure OCN — R — NCO, where R is an alkylene chain, for example, tetramethylene diisocyanate, pentamethylene diisocyanate, hexamethylene diisocyanate and octamethylene diisocyanate, and cycloaliphatic diisocyanates, e.g. 4:4'-dicyclohexylmethane diisocyanate.

Polyfunctional compounds suitable for use as polyurethane precursors in the process of our invention contain groups which are reactive with isocyanate groups, for example, hydroxyl, amino or carboxyl groups. Mixtures of two or more polyfunctional compounds may be used.

Polyfunctional compounds containing amino groups, and particularly hydroxyl groups, are preferred, as reaction of carboxyl groups with isocyanate groups produces carbon dioxide which may lead to the formation of voids in the product which may be undesirable, unless of course it is desired to produce a foamed product.

Suitable polyfunctional compounds containing hydroxyl groups include, for example, polyols and substantially hydroxyl-terminated polymers, e.g. hydroxy-terminated polyesters.

Examples of polyols include glycols of the structure HO — R — OH where R is, for example, an alkylene chain, e.g. ethylene glycol propylene glycol, butane-1:4-diol, pentane-1:5-diol, hexane-1:6-diol; di(ethylene glycol) and di(propylene glycol).

Other suitable polyols include polymers derived from glycols, for example, poly(ethylene glycol), poly(propylene glycol) and poly(butylene glycol) and polyols of functionality greater than two, for example, glycerol, pentaerythritol, and trialkylol alkanes, e.g. trimethylol propane, triethylol propane, tributylol propane and oxyalkylated derivatives of said trialkylol alkanes, e.g. oxyethylated trimethylol propane and oxypropylated trimethylol propane.

Polyesters suitable for use in the process of out invention include, for example, condensates of at least one diol of the structure HO — R — OH with at least one dicarboxylic acid of the structure HOOC — R — COOH, where R is e.g. an alkylene chain which may be the same or different in the diol and the diacid. Suitable examples include poly(ethylene adipate), poly(ethylene sebacate), poly(ethylene glutarate), poly(ethylene pimelate), poly(propylene adipate), poly(propylene sebacate), poly(propylene glutarate), poly(propylene pimelate) and condensates of at least one diol and at least one dicarboxylic acid with a polyol and/or a polycarboxylic acid of functionality greater than two, for example, a condensate of trimethylol propane, 1:2-propylene glycol and sebacic acid, or a pentaerythritol modified poly(oxyethylene adipate).

Diamines which may be used in the process of our invention include, for example, diamines of the structure $NH_2$ — R — $NH_2$, where R is an alkylene chain, e.g. ethylene diamine, propylene diamine, butane-1:4-diamine, and hexamethylene diamine.

In a further embodiment of our invention we provide a homogeneous composition suitable for use in the preparation of a shaped polymeric article which comprises from 5 to 95% by weight of a cross-linked polyurethane and from 95 to 5% by weight of at least one vinyl monomer.

The homogeneous composition preferably comprises from 5 to 60% by weight of a cross-linked polyurethane and from 95 to 40% by weight of at least one vinyl monomer.

In a further preferred embodiment the homogeneous composition comprises from 10 to 50% by weight, especially from 10 to 30% by weight, of cross-linked polyurethane and from 90 to 50% by weight, especially from 90 to 70% by weight, of at least one vinyl monomer.

In yet a further embodiment of our invention we provide a shaped polymeric article which comprises a homogeneous dispersion of from 5 to 95% by weight of cross-linked polyurethane and from 95 to 5% by weight of a polymer of at least one vinyl monomer.

The shaped articles of our invention are characterized by the fact that, as the cross-linked polyurethane is formed from precursors which are free of groups copolymerizable with a vinyl monomer, the polyurethane and the polymer derived from the vinyl monomer are not intentionally grafted one to the other and the products will, in general, exhibit two glass transition temperatures due respectively, to the polyurethane and the polymer of the vinyl monomer. Of course, some adventitious grafting may take place between the polyurethane and the polymer of the vinyl monomer, for example, by reason of interaction between the free radical generator, the vinyl monomer and an active hydrogen atom on a polyurethane precursor.

The shaped, polymeric article of our invention may comprise a homogeneous dispersion of from 5 to 60% by weight of cross-linked polyurethane and from 95 to 40% by weight of a polymer of at least one vinyl monomer.

Where it is desired to improve some of the properties of the vinyl polymer, and in particular to improve the impact strength of the vinyl polymer, without affecting unduly the other properties of the vinyl polymer, we prefer that the shaped polymeric article comprise a homogeneous dispersion of from 10 to 50% by weight, and especially from 10 to 30% by weight, of cross-linked polyurethane, and from 90 to 50% and especially from 90 to 70% by weight of a polymer of at least one vinyl monomer.

The properties of the products of our invention vary, of course, with the nature of the cross-linked polyurethane and vinyl polymer and the relative proportions thereof in the product.

Thus, where transparent shaped articles of high clarity are desired we find that it is advantageous to choose cross-linked polyurethane precursors and vinyl monomer which lead to the production of cross-linked polyurethane and vinyl polymer having substantially similar refractive indices.

For example, we have found that clear, transparent, shaped articles may be produced where the vinyl polymer is poly(methyl methacrylate) and the cross-linked polyurethane is derived by reaction of 4:4'-diphenyl-methane diisocyanate with a polyfunctional compound selected from oxypropylated trimethylol propane, a mixture of poly(propylene glycol) and oxypropylated trimethylol propane, a mixture of poly(propylene glycol) and oxypropylated trimethylol propane with either di(ethylene glycol) or poly(ethylene adipate), or a mixture of poly(ethylene adipate) and trimethylol propane.

Where it is desired to produce a clear, transparent shaped article it is preferred to use a polyisocyanate which imparts little or no color to the article. 4:4'-diphenyl methane diisocyanate is useful in this respect, although even in this case the amount of color imparted to the product increases with increase in the amount of 4:4'-diphenylmethane diisocyanate used. Color inhibitors may be used if desired.

It will be appreciated that shaped articles of our invention may be opaque, for example, if the refractive indices of the cross-linked polyurethane and the vinyl polymer are not substantially the same.

In certain cases the products of our invention show much improved impact strength when compared with the impact strength of the vinyl polymers present in the products, and when compared with products prepared by the hitherto known process of simultaneously gelling the precursors of the cross-linked polyurethane and polymerizing the vinyl monomer.

For example, whereas the notched impact strength of poly(methyl methacrylate) is approximately 2 kg. cm cm$^{-2}$ the notched impact strength of a product containing 90 to 80% by weight of poly(methyl methacrylate) and from 10 to 20% by weight of a cross-linked polyurethane derived by gelation of a mixture of poly(propylene glycol) and oxypropylated trimethylol propane with either 4:4'-diphenyl-methane diisocyanate or hexamethylene diisocyanate varies between approximately 5 and 13 kg cm cm$^{-2}$. In contrast, a product prepared from the above precursors by simultaneous gelation and polymerization and containing 15% by weight of cross-linked polyurethane and 85% by weight of poly(methyl methacrylate) has a notched impact strength of only approximately 5 kg cm cm$^{-2}$.

Similarly, where the cross-linked polyurethane is derived from a mixture of poly(propylene glycol), oxypropylated trimethylol propane and 4:4'-diphenyl-methane diisocyanate and the vinyl polymer is polyacrylonitrile and the product contains from 30 to 60% by weight of cross-linked polyurethane and from 70 to 40% by weight of polyacrylonitrile notched impact strengths of up to 30 kg cm cm$^{-2}$ or even greater may be obtained.

In general we find that as the ratio of molecular weight of the polyurethane to branch points in the polyurethane is decreased, that is, as the cross-link density of the product increases, the impact strength of the product decreases and the clarity of the product increases.

Where the vinyl polymer in the product is derived from a polyfunctional vinyl monomer we have found that, in general, the softening point of the product, e.g. as determined by Vicat softening point, may be increased, although the impact strength of the product may be decreased. Thus, where a significant increase in softening point of the product is desired without a marked adverse effect on the impact strength of the product the vinyl polymer may be derived, for example, from a mixture of monofunctional vinyl monomer and polyfunctional vinyl monomer the polyfunctional vinyl monomer being present in an amount up to 20%, and preferably from 1 to 5% by weight of the monofunctional vinyl monomer.

The notched impact strengths of the products of our invention may also be improved by incorporating fibrous reinforcement in the product, for example, in proportion of 10 to 50% by weight of the total weight of the fiber-reinforced product. The fibrous reinforcement may be, for example, glass, in the form of strands, mats, chopped rovings, or asbestos or carbon.

Other reinforcing agents, e.g. particulate reinforcing materials, may be incorporated into the products together with coloring agents and stabilizers well known in the art, e.g. antioxidants, antiozonants and u.v. stabilizers.

The shaped articles of our invention, particularly when in the form of a sheet, may be further shaped, and according to a further embodiment of our invention we provide a method of forming a shaped polymeric article of complex profile which comprises performing a further shaping operation on a shaped polymeric article of our invention which is of simple profile and is in a heat-softened state, and thereafter causing or allowing the thus further shaped article to cool to a temperature below that at which it is in a heat-softened state.

The further shaping process of our invention finds particular utility with products containing from 10 to 40% by weight of cross-linked polyurethane and from 90 to 60% by weight of vinyl polymer. Suitable methods of further shaping include, for example, blow-moulding, and vacuum forming.

The process of our invention may be modified to produce foamed gel polymerizates from the precursors of a cross-linked polyurethane and at least one vinyl monomer and as a further embodiment of our invention we provide a process in which a foaming agent is incorporated in the homogeneous composition and the composition is caused to foam after the start of the gelation reaction of the cross-linked polyurethane precursors.

It is preferred that the foaming reaction is completed before the gelation reaction of the cross-linked polyurethane precursors has proceeded to substantial completion.

The foams produced by our process are hard, have good tear strength and low air-permeability.

The invention is now illustrated by the following Examples in which all parts are expressed as parts by weight.

Methyl methacrylate was dried by standing over calcium hydride in a sealed container for at least 24 hours and immediately before use it was distilled under nitrogen at 90 mm pressure and a fraction boiling at 45° C was collected.

Styrene was dried by standing over calcium hydride in a sealed container for at least 24 hours and immediately before use was distilled under nitrogen and a fraction boiling at 55° to 60° C at 25 mm pressure was collected.

Acrylonitrile was purified by standing over calcium hydride for 2 days and was then distilled from calcium hydride and a fraction boiling at 77° to 78° C at 1 atmosphere pressure was collected. The distillate was stored over calcium hydride.

Glycol dimethacrylate was dried by standing over anhydrous calcium chloride for 1 day and was then decanted and stored over calcium hydride.

Hexamethylene diisocyanate was purified by distillation and a fraction boiling at 140° C at 9 mm of Hg pressure collected.

Isophorone diisocyanate was purified by distillation and a fraction boiling at 104° C at 0.2 mm of Hg pressure collected.

4:4'-diphenylmethane diisocyanate was purified by distillation under reduced pressure and a fraction boiling at 174° C at 0.1 mm Hg. pressure was collected.

Poly(propylene glycol) (Daltocel B56, Imperial Chemical Industries Ltd) and oxypropylated trimethylol propane (Daltocel T56, Imperial Chemical Industries Ltd) were dried before use by heating at 120° C for 2 hours under a pressure of nitrogen of 1 mm of Hg.

Other chemical compounds used in the preparation of the gel polymerizates were not purified and were used as received.

Unless otherwise stated the properties of the products were measured by the following procedures.

Vicat softening points were measured on a Davenport Vicat softening machine using samples of dimensions ¾ in. × ¾ in. × 1/16 in.

Impact strengths were measured on a Hounsfield Impact machine on unnotched samples of dimensions 2 in. × ¼ in. × ⅛ in. Notched impact strengths were measured on samples of similar dimensions having a ⅛ in. deep notch cut in the 2 in. × ¼ in. side.

Initial tensile moduli were measured on a Hounsfield Tensometer using an Extensometer Device at a strain rate of 5% per minute using dumbbell shaped specimens having a neck of dimensions 1.¼ in. × 1/16 in. × 5/32 in.

Tensile yield stresses, extensions to yield, ultimate stresses and extensions to break were measured on a Hounsfield Tensometer at a strain rate of 100% per minute using dumbbell shaped specimens having a neck of dimensions 1.¼ in. × 1/16 in. × 5/32 in.

Flexural moduli, flexural yield stresses and flexural strengths were measured on a Hounsfield Tensometer using specimens of dimensions 3 in. × ½ in. × 1/8 in with a crosshead speed of 0.05 in. min$^{-1}$ and a 2 in. span.

Hardness measurements were made using a Barcol Hardness Impressor.

Light transmittance was compared with that of ⅛ in. thick poly(methyl methacrylate) sheet (Perspex, Imperial Chemical Industries Ltd., Perspex is a Registered Trade Mark) using a double beam spectrophotometer.

Shear modulus and glass transition temperatures were measured using a Torsion Pendulum at 1 c/s.

Example 1.

A mixture of 100 parts of poly(propylene glycol) having a molecular weight of 1960, a hydroxyl value of 57.1 mg KOH g$^{-1}$, an acid value of 0.033 mg KOH g$^{-1}$ and containing 0.05% water (Daltocel B56, Imperial Chemical Industries Ltd) with 100 parts of oxypropylated trimethylol propane having a molecular weight of 3,060, a hydroxyl value of 55.0 mg. KOH g$^{-1}$, an acid value of 0.069 mg KOH g$^{-1}$ and containing 0.03% water (Daltocel T56, Imperial Chemical Industries Ltd) was added to 53 parts of 4,4'-diphenylmethane diisocyanate with stirring under nitrogen. The mixture was warmed to 60° C to give a homogeneous solution and 1.0 part of dibutyl tin dilaurate was added. An exothermic reaction occurred and the mixture was allowed to cool to room temperature to yield a clear viscous liquid prepolymer.

In three separate experiments a prepolymer prepared as above was dissolved at room temperature in, respectively, 2,360, 1,046 and 610 parts of methyl methacrylate (containing 0.1% by weight of azobisisobutyronitrile based on the methyl methacrylate) and to each of the resulting solutions 9.2 parts of butane-1,4-diol were added with stirring. Each of the solutions was degassed by connecting the flask containing the solution to a source of vacuum and then the solutions were poured into a separate mould formed by placing either a 1/16 in. or a ⅛ in. deep neoprene rubber gasket of dimensions 6 in. × 6 in. × ½ in. wide on a flat ⅛ in. deep glass plate. A similar glass plate was placed over the open face of each of the moulds and the plates in each mould were held together by spring clips. The solutions in the moulds were allowed to gel, that is, set to a non-flowing mass, by standing at room temperature for respectively, 4, 2 and 1 hours.

After the solutions had gelled the moulds were placed in an oven at 50° C for 16 hours and thereafter heated at 90° C for 2 hours and 115° C for 1 hour. The moulds were removed from the oven, allowed to cool and the polymer sheets removed therefrom. Polymers containing various proportions of polyurethane and poly(methyl methacrylate) had the properties shown in Table 1, Experiments 1, 2 and 3.

TABLE I

| Experiment | Proportions by weight in polymer sheet | | Initial modulus, kg. cm.$^{-2}$ | Notched impact strength, kg. cm. cm.$^{-2}$ | Vicat softening point | | Appearance of casting |
|---|---|---|---|---|---|---|---|
| | Polyurethane | Poly (methyl methacrylate) | | | 1/10 ° C. | 10/10 ° C. | |
| 1 | 10 | 90 | 24,500 | 4.5 | 103 | 116 | Clear and transparent. |
| 2 | 20 | 80 | 14,600 | 5.7 | 96 | 111 | Do. |
| 3 | 30 | 70 | 9,500 | 12.4 | 95 | 108 | Do. |

By way of comparison and in order to illustrate the effect of simultaneous gelation of the polyurethane and polymerization of the methyl methacrylate, 100 parts of the poly(propylene glycol) of molecular weight 1,960 and 100 parts of the oxypropylated trimethylol propane of molecular weight 3,060 as used above were mixed with 9.2 parts of butane-1,4-diol, 53 parts of 4,4'-diphenyl methane diisocyanate and 1.0 part of dibutyl tin dilaurate and in three separate experiments solutions prepared as above were mixed with respectively 2,360, 1,046 and 610 parts of methyl methacrylate (containing 0.1% of azobisisobutyronitrile based on the methyl methacrylate). In each case the solutions were degassed and poured into separate moulds following the above procedure and the solutions were immediately heated in an oven at 50° C for 10 hours, followed by heating at 90° C for 2 hours and at 115° C for 1 hour. In each case the polymer sheets were opaque and did not transmit light and showed visible phase separation between the polyurethane and the poly(methyl methacrylate).

Example 2.

Liquid prepolymers formed following the procedure of Example 1 were dissolved in respectively, 4,070, 2,560 and 1,810 parts of methyl methacrylate (containing 0.2% by weight of azobisisobutyronitrile based on the methyl methacrylate and degassed and to each of the resulting solutions 100 parts of poly(propylene glycol) and 100 parts of oxypropylated trimethylol propane as used in Example 1 were added. The mixtures were degassed and poured into separate moulds following the procedure of Example 1 and each was allowed to gel to a non-flowing mass by standing at room temperature for respectively 6, 4 and 2 hours. The moulds were heated following the procedure of Example 1 and in each case the polymer sheets were removed from the moulds and tested to give the results shown in Table 2, Experiments 1, 2 and 3.

The polymer sheets showed two glass transitions; one at −49° C due to the glass transition temperature of the polyurethane and the other at 110° C due to the poly(methyl methacrylate). Examination of the polymer sheets by electron microscopy indicated that the mean domain size of the poly(methyl methacrylate) in the sheets was approximately 2.0 $\mu$, 0.35 $\mu$ and 0.22 $\mu$ respectively in Experiments 1, 2 and 3. The polymethane region separating the domains was a few hundred Angstrom Units thick (<1,000 A).

methacrylate). Each of the polymer sheets removed from the moulds were turbid or hazy and showed visible phase separation.

Example 3.

In three separate experiments solutions of 100 parts of poly(propylene glycol) and 100 parts of oxypropylated trimethylol propane as used in Example 1 were added separately and at room temperature to solutions of 26.5 parts of 4,4'-diphenyl methane diisocyanate dissolved in respectively, 2,040, 1,280 and 908 parts of methyl methacrylate (containing 0.2% by weight of azobisisobutyronitrile based on the methyl methacrylate). In each case 1.0 part of dibutyl tin dilaurate was added to the resulting solutions which were then degassed and poured into separate moulds and allowed to gel to non-flowing masses by standing at room temperature for respectively 24, 12 and 10 hours. Each mould was then heated in an oven at 50° C for 16 hours, 90° C for 2 hours and 115° C for 1 hour following the procedure of Example 1, the moulds were allowed to cool, and the polymer sheets removed. The properties of the products are shown in Table 3, Experiments 1,2 and 3. The polymer sheets showed two glass transition temperature; one at −49° C due to the polyurethane and the other at approximately 110° C due to the poly(methyl methacrylate).

TABLE 3

| Experiment | Proportions by weight in polymer sheet | | Initial modulus, kg. cm.$^{-2}$ | Notched impact strength, kg. cm. cm.$^{-2}$ | Appearance of casting |
|---|---|---|---|---|---|
| | Polyurethane | Poly(methyl methacrylate) | | | |
| 1 | 10 | 90 | 18,500 | 6.0 | Transparent. |
| 2 | 15 | 85 | 18,400 | 8.7 | Do. |
| 3 | 20 | 80 | 15,500 | 10.4 | Do. |

In comparative experiments and in order to illustrate the effect of simultaneous gelation of the polyurethane and polymerization of the methyl methacrylate the above procedure was repeated except that the polyurethane was not allowed to gel in the mould at room temperature before the heating procedure was commenced. In each case it was observed that during the heating the solutions separated into two phases. The products removed from the moulds were opaque or turbid.

Example 4.

TABLE 2

| Experiment | Proportions by weight in polymer sheet | | Initial modulus, kg. cm.$^{-2}$ | Notched impact strength kg. cm. cm.$^{-2}$ | 1/10 Vicat softening point, ° C. | Appearance of casting |
|---|---|---|---|---|---|---|
| | Polyurethane | Poly (methylmethacrylate) | | | | |
| 1 | 10 | 90 | 23,100 | 6.1 | 103 | Transparent. |
| 2 | 15 | 85 | 18,000 | 9.1 | 98 | Do. |
| 3 | 20 | 80 | 11,600 | 12.1 | 96 | Do. |

By way of comparison and in order to illustrate the effect of the presence of poly(methyl methacrylate) in the methyl methacrylate before gelation of the polyurethane is substantially complete, the above procedure was repeated with 15 parts of polyurethane precursors in the proportions used above and in place of the methyl methacrylate, 82, 83.5 and 84.5 parts of methyl methacrylate having dissolve therein respectively, 3, 1.5 and 0.5 parts of poly(methyl methacrylate) having a viscosity average molecular weight of 236,000. In each case the polyurethane in the mixture was allowed to gel and the methyl methacrylate was polymerized following the above procedure. In each case the gel before polymerization of the methyl methacrylate was turbid due to the presence of the poly(methyl In three separate experiments 100 parts of oxypropylated trimethylol propane having a molecular weight of 310 were mixed with 260 parts of 4,4'-diphenylmethane diisocyanate and warmed to 60° C to give a clear solution and the resulting solutions were dissolved at 60° C in respectively, 1,840, 855 and 460 parts of methyl methacrylate (containing 100 ppm of quinol based on the methyl methacrylate). The mixtures were stirred and cooled in a water bath for 15 minutes so that the temperature did not rise above 60° C. The solutions were cooled to room temperature and 100 parts of oxypropylated trimethylol propane was added to each solution together with azobisisobutyroni-trile (0.4% by weight based on the methyl methacrylate). 0.5 part of dibutyl tin dilaurate was added to each solution and the solutions were degassed and poured into moulds, allowed to gel to non-flowing masses by standing at room temperature for respectively, 2, 1½ and ¾ hours and then heated in an oven at 50° C for 16 hours and at 115° C for 2 hours. The moulds were removed from the oven, the polymer sheets removed and tested to give the results shown in Table 4, Experiments 1, 2 and 3.

Example 5.

In three separate experiments polyurethane prepolymers prepared following the procedure of Example 1 were dissolved at room temperature in respectively 2,360, 1,490 and 1,050 parts of methyl methacrylate (containing 100 ppm quinol based on the methyl methacrylate). 10.4 parts of diethylene glycol were added to each solution and the mixtures allowed to stand at room temperature for 30 minutes. The thickened mixtures were degassed Example 7.

In nine experiments a mixture of 100 parts of poly(ethylene adipate) having a molecular weight of 2,014 and a hydroxyl value of 55.1 mg KOH $g^{-1}$, and 2.7 parts of trimethylol propane was heated to give a homogeneous solution, 33 parts of 4,4'-diphenyl-methane diisocyanate was added to each solution aNd the mixtures stirred at 80° C under $N_2$ until the infra red spectra of samples removed from the mixtures indicated the absence of hydroxyl groups. The resulting prepolymers were dissolved at room temperature in respectively, 2,120, 943, 550, 354, 236, 157, 101, 59 and 26.2 parts of methyl methacrylate (containing 0.04% by weight of azobisisobutyronitrile based on the methyl methacrylate) and 100 parts of poly(ethylene adipate) and 1.0 part of dibutyl tin dilaurate were added in each case. The resulting mixtures were allowed to thicken by

TABLE 6

| Experiment | Proportions by weight in polymer sheet | | Initial modulus, kg. cm.$^{-2}$ | Notched impact strength, kg. cm. cm.$^{-2}$ | Appearance of casting |
|---|---|---|---|---|---|
| | Polyurethane | Poly(methyl methacrylate) | | | |
| 1 | 10 | 90 | 27,000 | | Transparent. |
| 2 | 15 | 85 | 22,600 | 2.2 | Do. |
| 3 | 20 | 80 | 20,500 | 2.3 | Do. |

TABLE 4

| Experiment | Proportions by weight in polymer sheet | | Initial modulus, kg. cm.$^{-2}$ | Impact strength, kg. cm. cm.$^{-2}$ | | Appearance of casting |
|---|---|---|---|---|---|---|
| | Polyurethane | Poly(methyl methacrylate) | | Notched | Unnotched | |
| 1 | 20 | 80 | 31,000 | 1.7 | 18 | Clear and transparent. |
| 2 | 35 | 65 | 29,600 | 2.0 | 18 | Do. |
| 3 | 50 | 50 | 26,100 | 2.0 | 22 | Do. |

TABLE 5

| Experiment | Proportions by weight in polymer sheet | | Initial modulus, kg. cm.$^{-2}$ | Impact strength, kg. cm. cm.$^{-2}$ | | Appearance of casting |
|---|---|---|---|---|---|---|
| | Polyurethane | Poly(methyl methacrylate) | | Notched | Unnotched | |
| 1 | 10 | 90 | 27,000 | 1.9 | | Clear and transparent. |
| 2 | 15 | 85 | 23,000 | 2.6 | | Do. |
| 3 | 20 | 80 | 20,500 | 3.2 | | Do. | and poured into moulds as used in Example 1 and the moulds were heated in an oven at 50° C for 16 hours, for 2 hours at 90° C and for 1 hour at 115° C. The moulds were removed from the oven, the polymer sheets removed from the moulds and tested to give the results given in Table 5, Experiments 1, 2 and 3.

Example 6.

In three separate experiments polyurethane prepolymers prepared following the procedure of Example 1 were dissolved in respectively 3,970, 2,470 and 1,710 parts of methyl methacrylate containing 0.1% by weight of azobisisobutyronitrile based on the methyl methacrylate at room temperature and to each of the resulting solutions there was added a solution of 200 parts of poly(ethylene adipate) of molecular weight 2,014 and hydroxyl value 55.1 mg KOH $g^{-1}$ and 100 parts of methyl methacrylate (containing 0.1% by weight of azobisisobutyronitrile based on the methyl methacrylate). The resulting solutions were allowed to thicken at room temperature and when still pourable were degassed and poured into moulds, and allowed to gel by standing at room temperature for respectively 6, 6 and 5 hours, and heated in an oven following the procedure of Example 1. Each of the polymer sheets was tested and the results are given in Table 6, Experiments 1, 2 and 3.

standing at room temperature and when still pourable were degassed and poured into moulds, allowed to gel by standing at room temperature for respectively 8, 8, 6, 5, 5, 4, 4 and 3 hours and heated in an oven following the procedure of Example 1. The results of tests on the polymer sheets are given in Table 7, Experiments 1 to 9.

By way of comparison and to illustrate the effect of simultaneous gelation of the polyurethane and polymerization of methyl methacrylate clear solutions of 200 parts of poly(ethylene adipate) and 2.7 parts of trimethylol propane was prepared as described above. The cooled solutions were dissolved in respectively 2120, 943, 550, 354 and 236 parts of methyl methacrylate, and 33 parts of 4,4'-diphenyl methane diisocyanate, 1.0 part of dibutyl tin dilaurate, and 0.4% of azobisisobutyronitrile (based on the total weight of methyl methacrylate) were added to each of the resulting solutions. The resulting solutions were degassed and poured into moulds and immediately heated following the heating procedure described in Example 1. Polymer sheets removed from the moulds were tested and the results are given in Table 7, Experiments 10 to 15.

The polymer sheets showed two glass transition temperatures; one at less than 0° C due to the polyurethane

TABLE 7

| Experiment | Proportions by weight in polymer sheet | | Initial modulus, kg. cm.$^{-2}$ | Vicat softening point | | Appearance of casting |
|---|---|---|---|---|---|---|
| | Polyurethane | Poly(methyl methacrylate) | | 1/10 °C. | 10/10 °C. | |
| 1 | 10 | 90 | 17,500 | 108 | 118 | Clear and transparent. |
| 2 | 20 | 80 | 14,600 | 95 | 117 | Do. |
| 3 | 30 | 70 | 11,600 | 83 | 111 | Do. |
| 4 | 40 | 60 | 9,600 | 75 | 106 | Do. |
| 5 | 50 | 50 | 4,400 | 62 | 94 | Do. |
| 6 | 60 | 40 | 2,400 | 56 | 82 | Do. |
| 7 | 70 | 30 | 600 | | | Do. |
| 8 | 80 | 20 | 180 | | | Do. |
| 9 | 90 | 10 | 38 | | | Do. |
| 10 | 10 | 90 | Casting showed two distinct phases | | | |
| 11 | 20 | 80 | 11,200 | | | Very turbid. |
| 12 | 30 | 70 | 7,250 | | | Do. |
| 13 | 40 | 60 | 1,800 | | | Do. |
| 14 | 50 | 50 | 660 | | | Do. |
| 15 | 60 | 40 | 215 | | | Turbid. | and the other at approximately 110° C due to the poly(methyl methacrylate).

Example 8.

In three separate experiments solutions of 100 parts of poly(propylene glycol) and 100 parts of oxypropylated trimethylol propane as used in Example 1 were made. To each solution there was added at room temperature a solution of 26.5 parts of 4:4′-diphenylmethane diisocyanate in 200 parts of methyl methacrylate (containing 0.2% by weight of azobisisobutyronitrile based on the methyl methacrylate). 1.0 part of dibutyl tin dilaurate was added to each mixture.

The gelation reaction of each of the thus formed mixtures was allowed to proceed for about 60 minutes until viscous solutions were obtained and in a first experiment a further 1,850 parts of methyl methacrylate (containing 0.2% by weight of azobisisobutyronitrile) were added to one of the mixtures with constant stirring over a period of 2 hours. Similarly, in the second experiment a further 1,090 parts of methyl methacrylate (containing 0.2% by weight of azobisisobutyronitrile) were added over a period of 1 hour to another of the mixtures and in the third experiment a further 708 parts of methyl methacrylate (containing 0.2% by weight azobisisobutyronitrile) over a period of ¾ hour to the third mixture.

Each of the mixtures was then degassed and poured into a mould following the procedure of Example 1 and allowed to gel by standing at room temperature for 1 hour.

Each mould was then heated in an oven following the procedure of Example 1, the moulds removed from the oven, allowed to cool and the polymer sheets removed therefrom.

The properties of the polymer sheets are shown in Table 8, Experiments 1, 2 and 3. Each of the sheets could be vacuum formed and blow moulded when they were heated to a temperature of 140° C. The polymer sheets showed two glass transitions; one at −49° C due to the polyurethane and the other at approximately 110° C due to the poly(methyl methacrylate).

For purposes of comparison the properties of a cast sheet of poly(methyl methacrylate) prepared by polymerization of methyl methacrylate using 0.04% by weight of azobisisobutyronitrile are also given in Table 8.

TABLE 8.

| Experiment No. | | 1 | 2 | 3 |
|---|---|---|---|---|
| Proportions by weight in polymer sheet. | | | | |
| Polyurethane | | 10 | 15 | 20 |
| Poly(methyl methacrylate) | 100 | 90 | 85 | 80 |
| Tensile modulus kg cm$^{-2}$ | 31,000 | 22,500 | 18,000 | 15,000 |
| Tensile yield stress kg cm$^{-2}$ | — | 470 | 400 | 290 |
| Extension to yield % | — | 8 | 8 | 9 |
| Ultimate stress kg cm$^{-2}$ | 740–800 | 580 | 450 | 290 |
| Extension to break % | approx. 3 | 16 | 19 | 30 |
| Flexural modulus kg cm$^{-2}$ | 30,000 | 22,000 | 18,000 | 14,500 |
| Flexural yield stress kg cm$^{-2}$ | — | 700 | 520 | 350 |
| Notched impact strength kg cm cm$^{-2}$ | 1.8 | 5.5–6.8 | 7.8–9.8 | 12–13 |
| Unnotched impact strength kg cm cm$^{-3}$ | 35 | 90->110 | >130 | >130 |
| Falling dart impact strength ft. lb. B.S. 2782/3/306B) | <0.8 | 6–7 | 6–10 | 13–16 |
| Hardness - Darcol | 44–48 | 33–36 | 24–26 | 9–11 |
| Heat distortion temperature °C. ASTM D648/56 264 lb/sq.in. | 100–104 | 96 | 95 | 89 |
| 1/10 Vicat softening point °C | 111 | 103 | 101 | 98 |
| 10/10 Vicat softening point °C | 118 | 115 | 114 | 108 |
| % Light transmittancy | 92 | >90 | >90 | >90 |

In a further experiment the procedure of Experiment 2 above was followed except that methyl methacrylate used in Experiment 2 was replaced by a mixture of methyl methacrylate and glycol dimethacrylate (90:10 parts by weight) and the mould, after gelation of the polyurethane, was heated in an oven at a temperature of 50° C for 16 hours, 90° C for 1 hour and 120° C for 2 hours.

The polymer sheet removed from the mould contained 15% by weight of polyurethane and 85% by weight of vinyl polymer and was clear and transparent.

The sheet had 1/10 and 10/10 Vicat softening points of respectively, 113° and 133° C.

By way of comparison the procedure of the Experiment 2 above was followed except that the methyl methacrylate was replaced by a solution of 1% by weight of poly(methyl methacrylate) having a number average molecular weight of 100,000 in methyl methacrylate (containing 0.2% of azobisisobutyronitrile based on the weight of methyl methacrylate).

After the mixture had been degassed and poured into a mould following the above procedure and allowed to stand at room temperature for 2 hours the mixture was found to be cloudy.

After the mould had been heated following the above described procedure the polymer sheet containing 15% by weight of polyurethane and 85% by weight of poly(methyl methacrylate) removed from the mould was found to have a blue cloudy haze.

In a further comparative experiment the procedure of the above comparative experiment was repeated using, in place of the solution 1% by weight of poly(methyl methacrylate) in methyl methacrylate, a solution of methyl methacrylate containing 0.2% by weight of poly(methyl methacrylate) of high molecular weight which had been produced by exposure of the methyl methacrylate to daylight.

Substantially similar results were obtained as in the above comparative experiment.

Example 9.

The procedure of Example 8 was repeated in three separate experiments except that 134 parts of poly(propylene glycol) and 66 parts of oxypropylated trimethylol propane as used in Example 1 were used in each experiment.

The polymer sheets had the properties shown in Table 9, Experiments 1, 2 and 3. Each of the polymer sheets could be vacuum formed and blow moulded on heating to a temperature of 140° C.

The polymer sheets showed two glass transitions; one at −49° C due to the polyurethane and one at approximately 100° C due to the poly(methyl methacrylate).

TABLE 9.

| Experiment No. | 1 | 2 | 3 |
|---|---|---|---|
| Proportions by weight in polymer sheet. | | | |
| Polyurethane % | 10 | 15 | 20 |
| Poly(methyl methacrylate) % | 90 | 85 | 80 |
| Tensile modulus kg cm$^{-2}$ | 24,000 | 18,500 | 14,000 |
| Notched impact strength kg cm cm$^{-2}$ | 4.1 | 6.9 | 10.7 |
| Unnotched impact strength kg cm cm$^{-3}$ | 41 | 76 | >130 |

Example 10.

In two separate experiments solution of 100 parts of poly(propylene glycol) and 100 of oxypropylated trimethylol propane as used in Example 1 were mixed with solutions of 100 parts of methyl methacrylate (containing 0.1% azobisisobutyronitrile and 0.005% 2:4-dihydroxybenzophenone based on the weight of methyl methacrylate) and 17 parts of hexamethylene diisocyanate. 1 part of dibutyl tin dilaurate was added to each of the thus formed mixtures and the gelation reaction of each mixture was allowed to proceed for 1 to 2 hours to give very viscous solutions.

In the first experiment a further 1,130 parts of methyl methacrylate (containing 0.1% azobisisobutyronitrile and 0.005% of 2:4-dihydroxybenzophenone based on the weight of methyl methacrylate) was added to one of the mixtures with constant stirring over a period of 8 hours. Similarly, in a second experiment a further 768 parts of methyl methacrylate (containing 0.1% of azobisisobutyronitrile and 0.005% of 2:4-dihydroxybenzophenone based on the weight of methyl methacrylate) was added to the second mixture over a period of 6 hours.

Each of the thus formed mixtures was degassed and charged to a mould following the procedure of Example 1, allowed to stand at room temperature for 3 hours and heated in an oven at 50° C for 16 hours, 90° C for 1 hour and 115° C for 1 hour. The moulds were removed from the oven and the polymer sheets removed therefrom.

Each of the polymer sheets were clear in transmitted light but slightly hazy in reflected light. They could be vacuum formed and blow moulded when heated to 160° to 170° C to give moulded products having at room temperature similar optical properties to the polymer sheets removed from the moulds. The properties of the polymer sheets are given in Table 10, Experiments 1, 2 and 3.

The polymer sheets showed to glass transition temperatures; one at −58° C due to the polyurethane and the other at approximately 100° C due to the poly(methyl methacrylate).

Examination of the sheets under an optical microscope did not indicate the presence of two phases.

Examination in an electron microscope of samples from the sheets which had been stained with osmium tetroxide indicated that the mean size of the poly(methyl methacrylate) domains in the sheets was approximately 0.5 $\mu$.

TABLE 10

| Experiment No. | 1 | 2 |
|---|---|---|
| Proportions by weight in polymer sheet | | |
| Polyurethane | 15 | 20 |
| Poly(methyl methacrylate) | 85 | 80 |
| Flexural modulus kg cm$^{-2}$ | 17,300 | 13,600 |
| Notched impact strength kg cm cm$^{-2}$ | 8.2 | 13.5 |
| Unnotched impact strength kg cm cm$^{-3}$ | 130 | 130 |
| Falling dart impact strength ft.lb. | 7 to 9 | 13 to 16 |

The above procedure of the first experiment was repeated except that the mixture which was degassed was charged to a mould which contained a chopped strand glass fiber matt (FGE 2000 Fibre Glass Ltd). The plates of the mould were clamped together and the polyurethane was allowed to gel by allowing the mould to stand at room temperature for 16 hours. The mould was thereafter heated in an oven following the procedure of Example 1, the mould removed from the oven and allowed to cool and the polymer sheet, containing 28% by weight of glass fiber, removed therefrom.

The polymer sheet had the following properties:

| | |
|---|---|
| Flexural Modulus | 38,520 kg cm$^{-2}$ |
| Flexural Strength | 1,500 kg cm$^{-2}$ |
| Notched Impact Strength | 49.3–64.2 kg cm cm$^{-2}$. |
| Unnotched Impact Strength | 75.2–88.4 kg cm cm$^{-3}$ |

By way of comparison and in order to illustrate the effect of simultaneous gelation of the polyurethane and polymerization of the methyl methacrylate a solution of 100 parts of poly(propylene glycol) and 100 parts of oxypropylated trimethylol propane as prepared above was mixed with a solution of 1,230 parts of methyl methacrylate (containing 0.1% of azobisisobutyronitrile and 0.005% of 2:4-dihydroxybenzophenone), 17 parts of hexamethylene diisocyanate and 1 part of dibutyl tin dilaurate. Immediately after mixing the mixture thus formed was degassed and charged to a mould which was then heated in an oven at 50° C for 16 hours, 90° C for 1 hour and 115° C for 1 hour.

The polymer sheet removed from the mould contained 15% by weight of polyurethane and 85% by weight of poly(methyl methacrylate), did not transmit light and showed visible phase separation.

Examination of the sheet under an optical microscope indicated the presence of a discrete phase the size of the domains of which was in a range up to approximately 40μ.

The sheet had the following properties:

| | |
|---|---|
| Flexural Modulus | 4,600 kg cm$^{-2}$ |
| Flexural Yield Stress | 130 kg cm$^{-2}$ |
| Notched Impact Strength | 5.2 kg cm cm$^{-2}$ |
| Unnotched Impact Strength | 35 kg cm cm$^{-3}$ |

Example 11.

In three separate experiments 200 parts of oxypropylated trimethylol propane as used in Example 1 was added at room temperature to separate solutions of 17 parts of hexamethylene diisocyanate in 100 parts of methyl methacrylate (containing 0.2% by weight of azobisisobutyronitrile based on the methyl methacrylate).

1 part of dibutyl tin dilaurate was added to each of the mixtures thus formed and the gelation reaction of each mixture was allowed to proceed for 1 to 2 hours to produce viscous solutions.

Further quantities of methyl methacrylate (containing 0.2% by weight of azobisisobutyronitrile based on the methyl methacrylate) were then added to the mixtures with constant stirring as follows; in the first experiment, 1,850 parts over a period of 8 hours, in the second experiment 1,130 parts over a period of 4 hours; and in the third experiment 768 parts over a period of 4 hours.

Each of the mixtures thus formed was degassed and charged to a mould following the procedure of Example 1 and allowed to stand at room temperature for 2 hours. Each mould was then heated in an oven at 50° C for 16 hours, 90° C for 1 hour and 115° C for 2 hours.

Each of the polymer sheets removed from the moulds were substantially clear in transmitted light and slightly hazy in reflected light. The polymer sheets, which could be vacuum formed and blow boulded on heating to a temperature of 160° to 170° C to give moulded products having at room temperature similar optical properties to the polymer sheets removed from the moulds. The properties of the polymer sheets are given in Table 11, Experiments 1, 2 and 3.

The polymer sheets showed two glass transition temperatures; one at 158° C due to the polyurethane and the other at approximately 110° C due to the poly(methyl methacrylate).

TABLE 11.

| Experiment No. | 1 | 2 | 3 |
|---|---|---|---|
| Proportions by weight in polymer sheet | | | |
| Polyurethane | 10 | 15 | 20 |
| Poly(methyl methacrylate) | 90 | 85 | 80 |
| Flexural modulus kg cm$^{-2}$ | 21,500 | 17,900 | 14,600 |
| Notched impact strength kg cm cm$^{-2}$ | 5.4 | 7.6 | 11.3 |
| Unnotched impact strength kg cm cm$^{-3}$ | 76 | 100 to >130 | >130 |
| Falling dart impact strength ft.lb. | 4 to 6 | 7 to 8 | 10 to 13 |

Example 12.

100 parts of a pentaerythritol modified poly(oxyethylene adipate) (Daltoroll PR1, Imperial Chemical Industries Ltd) having a hydroxyl value of 76 mg KOH g$^{-1}$ and an acid value of 4 mg KOH g$^{-1}$ were added at room temperature to a solution of 12 parts of hexamethylene diisocyanate in 50 parts of methyl methacrylate (containing 0.2% by weight of azobisisobutyronitrile based on the methyl methacrylate). 1 part of dibutyl tin dilaurate was added to the thus formed mixture and the gelation reaction was allowed to proceed for 1 to 2 hours at room temperature to produce a very viscous solution.

A further 585 parts of methyl methacrylate (containing 0.2% by weight of azobisisobutyronitrile based on the methyl methacrylate) were added to the mixture with constant stirring over a period of 3 hours and the mixture was degassed and poured into a mould following the procedure of Example 1 and the gelation reaction was allowed to proceed at room temperature for 2 hours. The mould was then heated in an oven following the procedure of Example 11.

The polymer sheet removed from the mould contained 15% by weight of polyurethane and 85% by weight of poly(methyl methacrylate) and had a slight haze in reflected light but was clear in transmitted light. There was no phase separation visible to the naked eye.

The polymer sheet had the following properties:

| | |
|---|---|
| Flexural Modulus | 85,500 kg cm$^{-2}$ |
| Notched Impact Strength | 6.6 kg cm cm$^{-2}$ |
| Unnotched Impact Strength | 86 kg cm cm$^{-3}$ |
| Falling Dart Impact Strength | 6 to 7 ft. lb. |

The polymer sheets showed two glass transition temperatures; one at less than 0° C due to the polyurethane and the other at approximately 105° C due to the poly(methyl methacrylate).

Example 13.

100 parts of a condensate of 132 parts of trimethylol propane, 1216 parts of 1,2-propylene glycol and 3,270 parts of sebacic acid having a hydroxyl value of 31 mg KOH g$^{-1}$ and an acid value of 13 mg KOH g$^{-1}$ were dissolved in 60 parts of methyl methacrylate (containing 0.2% by weight of azobisisobutyronitrile based on the methyl methacrylate at room temperature. 6.5 parts of hexamethylene diisocyanate and 0.5 part of dibutyl tin dilaurate were added to the solution and the gelation reaction of the mixture was allowed to proceed at room temperature for 1 to 2 hours to produce a viscous solution.

A further 544 parts of methyl methacrylate (containing 0.2% by weight of azobisisobutyronitrile based on the methyl methacrylate) were added to the mixture with constant stirring over a period of 6 hours and the mixture was degassed and poured into a mould following the procedure of Example 1. The gelation reaction was allowed to proceed at room temperature for a further 2 hours. The mould was then heated in an oven following the procedure of Example 10.

The polymer sheet removed from the mould contained 15% by weight of polyurethane and 85% by weight of poly(methyl methacrylate) and was clear in transmitted light. The polymer sheet had the following properties:

| | |
|---|---|
| Flexural Modulus | 17,300 kg cm$^{-2}$ |
| Flexural Yield Stress | 500 kg cm$^{-2}$ |
| Notched Impact Strength | 7.5 kg cm cm$^{-2}$ |
| Unnotched Impact Strength | 100 to 130 kg cm cm$^{-2}$ |
| Falling Dart Impact Strength | 6 to 8 ft.lb. |

Example 14.

A solution of 100 parts of poly(propylene glycol) and 100 parts of oxypropylated trimethylol propane as used in Example 1 was added at room temperature to 44.5 parts of isophorone diisocyanate. 0.1 part of dibutyl tin dilaurate was added to the thus formed mixture which was then heated to 80° C and maintained at this temperature until it showed no trace of residual hydroxyl groups on examination by infra-red spectroscopy. The mixture was then allowed to cool to room temperature. The mixture was then dissolved in 1,140 parts of methyl methacrylate (containing 0.4% by weight of azobisisobutyronitrile based on the methyl methacrylate) at room temperature to form solution I.

8.8 parts of butane-1,4-diamine were dissolved in 1,140 parts of methyl methacrylate (containing 0.4% by weight of azobisisobutyronitrile based on the methyl methacrylate) at room temperature to form solution II. Solutions I and II were degassed and mixed thoroughly during degassing and poured into a mould as used in Example 1. After the gelation reaction had proceeded for 30 seconds the mould was heated in an oven following the procedure of Example 10.

The polymer sheet removed from the mould contained 10% by weight of polyurethane and 90% by weight of poly(methyl methacrylate) and was clear and transparent and had the following properties:

| | |
|---|---|
| Flexural Modulus | 23,000 kg cm$^{-2}$ |
| Flexural Yield Stress | 910 kg cm$^{-2}$ |
| Notched Impact Strength | 4.6 kg cm cm$^{-2}$ |

Example 15.

A solution of 80 parts of poly(propylene glycol) and 30 parts of oxypropylated trimethylol propane as used in Example 1 was mixed with 6.7 parts of hexamethylene diisocyanate, 6.8 parts of isophorone diisocyanate and 0.01 part of dibutyl tin dilaurate. The thus formed mixture was then heated to 80° C and maintained at this temperature until it showed no trace of residual hydroxyl groups on examination by infra-red spectroscopy. The mixture containing an isocyanate-terminated prepolymer was then allowed to cool to room temperature and 94 parts of the mixture were dissolved in 289 parts of methyl methacrylate (containing 0.4% by weight of azobisisobutyronitrile based on the methyl methacrylate) to form solution I.

1 part of butane-1,4-diamine was dissolved in 269 parts of methyl methacrylate to form solution II.

Solutions I and II were degassed and mixed thoroughly during degassing and poured into a mould as used in Example 1. After the gelation reaction had proceeded for 45 seconds the mould was heated in an oven following the procedure of Example 11.

The polymer sheet removed from the mould contained 15% by weight of polyurethane and 85% by weight of poly(methyl methacrylate) and had the following properties:

| | |
|---|---|
| Notched Impact Strength | 7.7 kg cm cm$^{-2}$ |
| Unnotched Impact Strength | 130 kg cm cm$^{-3}$ |
| Falling Dart Impact Strength | 6 to 8 ft. lb. |

In a further experiment an isocyanate-terminated prepolymer was prepared from poly(propylene glycol) and oxypropylated trimethylol propane following the above procedure.

9.4 parts of the prepolymer were dissolved at room temperature in 28 parts of methyl methacrylate containing 0.4 parts of a paste of benzoyl peroxide (catalyst paste B, Scott-Bader and Co.Ltd) to form solution I.

0.1 part of butane-1,4-diamine was dissolved at room temperature in 28 parts of methyl methacrylate containing 0.4 part of an amine accelerator (accelerator D, Scott-Bader and Co.Ltd) to form solution II.

Solutions I and II were degassed and mixed thoroughly during degassing and poured into a mould as used in Example 1. After standing at room temperature for 24 hours the product was a sheet of high transparency. The sheet was finally heated in an oven at a temperature of 115° C for 2 hours.

The polymer sheet contained 15% by weight of polyurethane and 85% by weight of poly(methyl methacrylate).

Example 16.

In six separate experiments mixtures of 100 parts of poly(propylated glycol) having a molecular weight of 2,000, 100 parts of oxypropylated trimethylol propane having a molecular weight of 300 and 52 parts of 4:4'-diphenylmethane diisocyanate were heated to a temperature of 60° C under nitrogen to give clear solutions and 0.2 part of benzoyl chloride and 0.2 part of dibutyl tin dilaurate were added to each solution with vigorous stirring. An exothermic reaction occurred and the temperature of the mixtures rose to 80° to 90° C. The mixtures were allowed to cool and held at a temperature of 60° C for 2 hours.

The clear, viscous prepolymers which were formed were allowed to cool to room temperature and were dissolved in portions of methyl methacrylate (containing 0.2% by weight of azobisisobutyronitrile based on the methyl methacrylate) indicated in Table 12 to give clear solutions.

Further portions of poly(propylene glycol) and oxypropylated trimethylol propane indicated in Table 12 were added to the solutions of prepolymer in methyl methacrylate together with 1 part of dibutyl tin dilaurate in each case.

The resulting mixtures were allowed to stand at room temperature and were then degassed following the procedure of Example 1. When the mixtures were still pourable they were charged to moulds formed by two 8 in. × 8 in. × ⅛ in glass plates between which was placed a 1 in. wide × ⅛ in deep brass gasket and inboard of the brass gasket a ¼ in. wide ×3/16 in. deep butyl rubber gasket. The glass plates were placed between two brass plates which were in turn bolted together by means of spring-loaded bolts.

The mixtures were allowed to gel by standing at room temperature for 5 hours. The moulds were then placed in an oven and heated at a temperature of 50° C for 15 hours, 90° C for 1 hour and finally at 120° C for 2 hours. The moulds were removed from the oven, allowed to cool and the polymer sheets removed therefrom. The polymer sheets each contained 20% by weight of polyurethane and 80% by weight of poly(methyl methacrylate) and had the properties shown in Table 12.

The polymer sheets showed two glass transition temperatures; one at −49°C due to the polyurethane and the other at approximately 110°C due to the poly(methyl methacrylate).

Example 17.

The procedure of Experiment 3 of Example 16 was repeated except that the temperature at which the methyl methacrylate was initially polymerized was varied. In Experiments 1 to 4 the temperature at which the methyl methacrylate was initially polymerized for 15 hours was respectively, 40°, 50°, 60° and 70° C. Thereafter, in each experiment, the procedure of Example 16 was followed and the methyl The thus formed prepolymers were dissolved at room temperature in respectively, 1,010, 650, 432 and 288 parts of acrylonitrile (containing 0.2% by weight of azobisisobutyronitrile based on the acrylonitrile) to give clear solutions and a further 90 parts of poly(propylene glycol), 90 parts of oxypropylated trimethylol propane and 1 part of dibutyl tin dilaurate were added to each solution.

The resulting mixtures were allowed to stand at room temperature, degassed and, while still pourable, were charged to separate moulds following the procedure of Example 16.

Each mixture was allowed to gel by standing at room temperature for 7 hours and the moulds were then heated in an oven following the procedure of Example 16.

The properties of the polymer sheets are shown in the following Table 13, Experiment 1 to 4.

The polymer sheets showed two glass transitions; one at −50° C due to the polyurethane and the other at greater than 100° C due to the polyacrylonitrile.

TABLE 13.

| Exp. No. | Proportions by wt. in polymer sheet | | Shear Modulus kg cm$^{-2}$ | Notched Impact Strength kg cm cm$^{-2}$ |
|---|---|---|---|---|
| | Polyurethane | Polyacrylonitrile | | |
| 1 | 30 | 70 | 6.0×10$^3$ | 7.5 |
| 2 | 40 | 60 | 3.0×10$^3$ | 30 |
| 3 | 50 | 50 | 1.5×10$^2$ | — |
| 4 | 60 | 40 | 1.1×10$^2$ | — |

TABLE 12

| Experiment No. | Parts added to prepolymer in methyl methacrylate | | Methyl methacrylate parts added to prepolymer | Ratio OH/NCO | Shear modulus, kg. cm.$^{-2}$ | Ultimate tensile strength, kg. cm.$^{-2}$ | Notched impact strength, kg. cm. cm.$^{-2}$ |
|---|---|---|---|---|---|---|---|
| | Poly (propylene glycol) | Oxypropylated trimethylol propane | | | | | |
| 1 | 72 | 72 | 1,784 | 0.83:1 | 7.4×10$^3$ | 430 | 11.0 |
| 2 | 82 | 82 | 1,664 | 0.875:1 | 6.7×10$^3$ | 350 | 12.4 |
| 3 | 90 | 90 | 1,728 | 0.915:1 | 6.5×10$^3$ | 300 | 13.2 |
| 4 | 99 | 99 | 1,808 | 0.91:1 | 6.5×10$^3$ | 280 | 12.7 |
| 5 | 108 | 108 | 1,872 | 1:1 | 6.0×10$^3$ | 250 | 9.0 |
| 6 | 117 | 117 | 1,944 | 1.04:1 | 5.7×10$^3$ | 200 | 5.0 | methacrylate polymerization was continued at 90° C for 1 hour and 120° C for 2 hours.

The properties of the polymer sheets are shown in the following Table 13.

The polymer sheets showed two glass transition temperatures; one at −49° C due to the polyurethane and the other at approximately 110° C due to the poly(methyl methacrylate).

TABLE 13.

| Exp. No. | Temperature of initial polymerization of methyl methacrylate °C | Shear Modulus kg cm$^{-2}$ | Ultimate Tensile Strength kg cm$^{-2}$ | Notched Impact Strength kg cm cm$^{-2}$ |
|---|---|---|---|---|
| 1 | 40 | 6.5×10$^3$ | 300 | 6.5 |
| 2 | 50 | 6.5×10$^3$ | 300 | 6.5 |
| 3 | 60 | 5.2×10$^3$ | 200 | 5.2 |
| 4 | 70 | 3.5×10$^3$ | 125 | 3.5 |

Example 18.

In four separate experiments clear urethane prepolymers were prepared from 100 parts of poly(propylene glycol) 100 parts of oxypropylated trimethylol propane, 52 parts of 4:4'-diphenylmethane diisocyanate and 0.2 part each of benzoyl chloride and dibutyl tin dilaurate following the procedure of Example 16.

Example 19.

A clear, viscous prepolymer was formed from 200 parts of oxypropylated trimethylol propane as used in Example 16, 52 parts of 4:4'-diphenylmethane diisocyanate, and 0.2 part each of benzoyl chloride and dibutyl tin dilaurate following the procedure of Example 16.

The thus formed clear viscous prepolymer was dissolved at room temperature in 1,808 parts of acrylonitrile (containing 0.2% by weight of azobisisobutyronitrile based on the acrylonitrile) and a further 200 parts of oxypropylated trimethylol propane and 1 part of dibutyl tin dilaurate were added to the solution.

The resulting mixture was allowed to stand at room temperature, was degassed, and while still pourable, was poured into a mould following the procedure of Example 16.

The mixture was allowed to gel by standing at room temperature for 15 hours and the mould was then placed in an oven and heated at a temperature of 50° C for 24 hours, 80° C for 2 hours and 100° C for 2 hours. The mould was removed from the oven, allowed to cool and the clear, slightly yellow colored, polymer sheet removed therefrom. The polymer sheet contained 20% by weight of polyurethane and 80% by weight of polyacrylonitrile and had the following properties:

| Shear Modulus | $9.73 \times 10^3$ kg cm$^{-2}$ |
| Notched Impact Strength | 2.22 kg cm cm$^{-2}$ |

The polymer sheets showed two glass transition temperatures; one at −50° C due to the polyurethane and the other at greater than 100° C due to the polyacrylonitrile.

Example 20.

The procedure of Example 19 was repeated except that 2,560 parts of acrylonitrile were used. The resultant clear, slightly yellow colored polymer sheet contained 15% by weight of polyurethane and 85% by weight of polyacrylonitrile and had the following properties:

| Shear Modulus | $5.46 \times 10^3$ kg cm$^{-2}$ |
| Unnotched Impact Strength | 4.8 kg cm cm$^{-3}$ |

Example 21.

In five separate experiments the procedure of Example 1 was followed except that the methyl methacrylate was replaced by respectively 2,360, 1,049, 612, 393 and 262 parts of styrene (containing 0.4% by weight azobisisobutyronitrile based on the styrene). The solutions were poured into moulds and allowed to stand at room temperature for 24 hours and thereafter heated in an oven at 60° C for 18 hours and for 4 hours at 110° C. The polymer sheets were removed from the moulds and heated for a further 24 hours under a vacuum of 40 mm. The polymer sheets were tested to give the results shown in Table 14, Experiments 1 to 5. Each of the sheets were opaque but homogeneous and showed no visible phase separation.

By way of comparison and to illustrate the effect of simultaneous gelation and polymerization of the styrene, the above procedure was repeated except that the solutions in the moulds were immediately heated at 60° C in an oven. In each case, that is for samples containing 10, 20, 30 and 40 parts of polyurethane and respectively 90, 80, 70 and 60 parts of styrene, the polystyrene precipitated from solution before gelation of the polyurethane was completed. Each of the sheets comprised two distinct phases.

TABLE 14.

| Exp. No. | Proportions by weight in polymer sheet | | Initial Modulus kg cm$^{-2}$ |
| --- | --- | --- | --- |
| | Polyurethane | Polystyrene | |
| 1 | 10 | 90 | 24,000 |
| 2 | 20 | 80 | 18,000 |
| 3 | 30 | 70 | 17,600 |
| 4 | 40 | 60 | 6,700 |
| 5 | 50 | 50 | 4,500 |

Example 22.

A solution of 40 parts of poly(ethylene adipate) having a molecular weight of 2014, a hydroxyl value of 55.1 mg KOH g$^{-1}$ and 1 part of oxypropylated trimethylol propane having a molecular weight of 310 and a hydroxy value of 545 mg KOH g$^{-1}$ was added at room temperature to a solution of 6.3 parts of 4:4'-diphenylmethane diisocyanate in 48 parts of glycol dimethacrylate (containing 100 parts per million of quinol based on the glycol dimethacrylate).

The mixture was allowed to stand at room temperature for 1 to 2 hours to form a viscous solution and 0.2 parts of di-tertiary-butyl peroxide were then added to the mixture which was then degassed and poured into a mould following the procedure of Example 1.

After 2 hours the mould was placed in an oven and heated at a temperature of 110° C for 2 hours and finally at 120° C for 1 hour. The mould was removed from the oven, allowed to cool and the polymer sheet removed from the mould. The sheet which contained 50% by weight of polyurethane and 50% by weight of the polymer of glycol dimethacrylate was flexible and had the following properties.

| Flexural Modulus | 5,000 kg cm$^{-2}$ |
| Notched Impact Strength | 9.7 kg cm cm$^{-2}$ |
| Unnotched Impact Strength | >130 kg cm cm$^{-3}$ |
| Vicat Softening Point. | Samples did not show a softening point on elevation of the temperature from room temperature to 150°C). |

Example 23.

The procedure of Example 16, Experiment 4 was repeated except that the methyl methacrylate used in Example 16 was replaced by a mixture of 362 parts of styrene and 1,446 parts of methyl methacrylate (containing 0.2% by weight of azobisisobutyronitrile based on the total vinyl monomer).

The polymer sheet which contained 20% by weight of polyurethane and 80% by weight of vinyl polymer had the following properties:

| Shear Modulus | $5.5 \times 10^3$ kg cm$^{-2}$ |
| Notched Impact Strength | 16 kg. cm cm$^{-2}$ |

Example 24.

The procedure of Example 16, Experiment 4 was repeated except that the methyl methacrylate used in Example 16 was replaced by a mixture of 212 parts of acrylonitrile and 848 parts of methyl methacrylate (containing 0.2% by weight of azobisisobutyronitrile based on the total vinyl monomer).

The polymer sheet which contained 30% by weight of polyurethane and 70% by weight of vinyl polymer had a shear modulus of $8.0 \times 10^2$ kg cm$^{-2}$. The polymer sheet was rubbery.

Example 25.

The procedure of Example 19 was followed except that acrylonitrile used in Example 19 was replaced by a mixture of 528 parts of methyl methacrylate and 528 parts of styrene (containing 0.3% by weight of azobisisobutyronitrile based on the total vinyl monomer), and the resultant mixture, after allowing to gel by standing in a mould at room temperature for 15 hours was heated in a water bath at 60° C for 24 hours and then in an oven for 1 hour at 80° C, 2 hours at 100° C and finally for 3 hours at 125° C.

The polymer sheet was clear and transmitted light and contained 30% by weight of polyurethane and 70% by weight of vinyl polymer and had the following properties:

| Shear Modulus | $4.2 \times 10^3$ kg cm$^{-2}$ |
| Notched Impact Strength | 3.2 kg cm cm$^{-2}$ |

In a further experiment the above procedure was repeated except that 792 parts of styrene and 264 parts of methyl methacrylate were used.

The polymer sheet was clear and transmitted light and had the following properties:

| Shear Modulus | $5.14 \times 10^3$ kg cm$^{-2}$ |
| Notched Impact Strength | 2.9 kg cm cm$^{-2}$ |

In yet a further experiment the above procedure was repeated except that 1,056 parts of styrene were used in place of the mixture of styrene and methyl methacrylate.

The polymer shear was slightly opaque yet transmitted light and had the following properties:

| | |
|---|---|
| Shear Modulus | $3.64 \times 10^3$ kg cm$^{-2}$ |
| Notched Impact Strength | 15.1 kg cm cm$^{-2}$ |

Example 26.

The procedure of Example 16, Experiment 4 was followed in two experiments except that the acrylonitrile used in Example 16 was replaced by, respectively, a mixture of 528 parts of styrene and 528 parts of acrylonitrile, and a mixture of 212 parts of styrene and 845 parts of acrylonitrile (each mixture containing 0.2% by weight of azobisisocutyronitrile based on the total vinyl monomer).

Each of the polymer sheets contained 30% by weight of polyurethane and 70% by weight of vinyl polymer and had shear moduli of respectively $0.55 \times 10^3$ kg cm$^{-2}$ and $0.74 \times 10^3$ kg cm$^{-2}$.

Example 7.

A clear, viscous prepolymer was formed from 100 parts of poly(propylene glycol), 100 parts of oxypropylated trimethylol propane, 52 parts of 4:4'-diphenylmethane diisocyanate and 0.2 part of each of benzoyl chloride and dibutyl tin dilaurate following the procedure of Example 16.

The prepolymer was cooled to −20° C and 678 parts of liquid vinyl chloride were added from a graduated burette at a temperature of −20° C to give a clear solution. 0.2% by weight of azobisisobutyronitrile based on the vinyl chloride were added to the solution. A further mixture of 100 parts of poly(propylene glycol), 100 parts of oxypropylated trimethylol propane, and 1 part of dibutyl tin dilaurate, precooled to −20° C, was added.

When the resultant mixture was still pourable it was poured into a glass tube precooled to −20° C and the tube was sealed and allowed to warm to room temperature. The tube was allowed to remain at room temperature for 15 hours and was then heated in an oven at 50° C for 24 hours.

The tube was removed from the oven and the glass was broken and the cast polymer, containing 40% by weight of polyurethane and 60% by weight of poly(vinyl chloride), removed.

Samples suitable for measurement of shear modulus and impact strength were cut from the cast polymer sample.

| | |
|---|---|
| Shear Modulus | $2.0 \times 10^3$ kg cm$^{-2}$ |
| Notched Impact Strength | 17 kg cm cm$^{-2}$ |

Example 28.

40 parts of poly(propylene glycol) and 40 parts of oxypropylated trimethylol propane as used in Example 1 were mixed with 7.2 parts of hexamethylene diisocyanate and 0.2 part of dibutyl tin dilaurate. The resulting mixture was allowed to react at room temperature for 5–20 minutes, and was then diluted with a portion of a solution containing 135 parts of nonyl methacrylate and 2.6 parts of glycol dimethacrylate (containing 100 parts per million of quinol and 0.4% by weight of azobisisobutyronitrile based on the total vinyl monomer). Thereafter further portions of the solution were added until the whole solution had been added over a period of 3 hours.

The mixture was then degassed and poured into a mould following the procedure of Example 1. The gelation reaction was allowed to proceed at room temperature for 4 hours and the mould was then placed in an oven and heated at a temperature of 50° C for 16 hours, 90° C for 1 hour and 115° C for 2 hours.

The polymer sheet removed from the mould contained 40% by weight of polyurethane and 60% by weight of vinyl polymer and was elastomeric and had the following properties:

| | |
|---|---|
| Initial Modulus | 17 kg cm$^{-2}$ |
| 300% Modulus | 12 kg cm$^{-2}$ |
| Tensile Strength | 70 kg cm$^{-2}$ |
| Extension to Break | 500 to 600% |

The properties were measured on a Hounsfield Tensometer using dumbbell shaped specimens and a strain rate of 100% per minute.

Example 29

A solution of 20 parts of 4:4'-diphenylmethane diisocyanate, 120 parts of methyl methacrylate (containing 100 parts per million of quinol and 0.4% by weight of azobisisobutyronitrile based on the weight of methyl methacrylate) and 0.4 parts of dibutyl tin dilaurate was prepared at room temperature.

To this solution there was added 140 parts of oxypropylated trimethylol propane as used in Example 1 and the mixture thus formed was maintained at a temperature of 25° to 30° C, with cooling if necessary, for a period of 20 minutes until the mixture was viscous.

100 parts of mixed isomers of 2:4- and 2:6-toluene diisocyanate and 2 parts of Silicocell 380 surfactant (Imperial Chemical Industries Ltd) where then added to the mixture which was stirred vigorously for 1 minute. The vigorous stirring was continued during the addition of 9.6 parts of water.

When the foam began to rise the stirring was stopped and the foam allowed to rise. The foam was allowed to stand at room temperature for 1 hour and was thereafter heated in an oven at a temperature of 60° C for 16 hours and finally at 110° C for 2 hours.

The foam contained 70% by weight of polyurethane and 30% by weight of polymethyl methacrylate).

In a further experiment the above procedure was repeated except that 0.5% by weight of di-tert butyl-hyponitrile (based on the weight of methyl methacrylate) was used in place of the azobisisobutyronitrile and, after the foam had risen, it was allowed to stand for 2 days at room temperature before subsequent heating in an oven.

Example 30

A solution of 30 parts of glycol dimethacrylate and 170 parts of methyl methacrylate (containing 100 parts per million of quinol and 0.8 parts of azobisisobutyronitrile) was prepared at room temperature.

To 160 parts of this solution there was added at room temperature 20 parts of 4:4'-diphenylmethane diisocyanate, 120 parts of oxypropylated trimethylol propane as used in Example 1 and 0.1 part of dibutyl tin dilaurate.

The resulting mixture was allowed to stand at room temperature for 20–30 minutes while maintaining the temperature in the range 20° to 30° C, by cooling if necessary to give a viscous solution. 100 parts of mixed isomers of 2:4- and 2:6-toluene diisocyanate, 6 parts of Silicocell 380 surfactant (Imperial Chemical Industries Ltd), and 0.4 parts of dibutyl tin dilaurate were then added to the mixture and the mix was stirred vigorously for 5 minutes. 9.6 parts of water were then added to the mixture and the vigorous stirring was maintained until the mixture began to foam. The foam was then allowed to rise and remain at room temperature for 1 hour. Thereafter the foam was heated in an oven at a temperature of 60° C for 16 hours and finally at 120° C for 2 hours. The foam contained 60% by weight of polyurethane and 40% by weight of the polymer of glycol dimethacrylate and methyl methacrylate and had the properties shown in Table 15.

TABLE 15.

| Property | Method of Measurement |
|---|---|
| Density 41.1 kg metre$^{-3}$ | B.S. 3667 Part 4. |
| Compression set 35 (75% compression, 22 hours at 70°C). | B.S. 3667 Part 7. |
| Tensile Strength 3.2 kg cm$^{-2}$ | |
| Elongation at break 136% | B.S. 3667 Part 6. |
| Tear Strength 0.93 kg cm$^{-1}$ | A.S.T.M. D1564 |
| Compression Hardness at 40% compression 1st cycle 166 g cm$^{-2}$ | I.C.I. Dyestuffs Division Physical Test No. 1. |
| 2nd cycle 114 g cm$^{-2}$ | |
| 3rd cycle 104 g cm$^{-2}$ | |
| 4th cycle 103 g cm$^{-2}$ | |
| Compression Hardness 4th cycle 25% compression 81 g cm$^{-2}$ | |
| 50% compression 130 g cm$^{-2}$ | |
| 65% compression 238 g cm$^{-2}$ | |
| Resilience 32% rebound | A.S.T.M. D1564. |
| Air Permeability <2ft$^3$ hour$^{-1}$ | |

What we claim is:

1. In a process for the preparation of a shaped polymeric article by gel-polymerizing a homogeneous composition comprising at least one vinyl monomer and the precursors of a cross-linked polyurethane and shaping the composition at a stage when it is still fluid, in which the composition comprises from 5 to 95% by weight of cross-linked polyurethane precursors free of groups copolymerizable with vinyl monomer and from 95 to 5% by weight of at least one vinyl monomer, the vinyl monomer being free from groups reactive with said precursors, the improvement which comprises first substantially completing the gelation of the polyurethane before polymerization of the vinyl monomer is allowed to proceed to the extent that the vinyl polymer so produced forms a separate phase, and thereafter completing the polymerization of the vinyl monomer.

2. A process as claimed in claim 1 in which the shaped polymeric article produced by the process when examined in thin sections by electron microscopy is seen to contain domains of vinyl polymer having dimensions not greater than 10 μ separated by regions composed by polyurethane having dimensions not greater than 1,000 A.

3. A process as claimed in claim 1 in which the composition comprises from 5 to 60% by weight of cross-linked polyurethane precursors and from 95 to 40% by weight of at least one vinyl monomer.

4. A process as claimed in claim 1 in which the composition comprises from 10 to 50% by weight of cross-linked polyurethane precursors and from 90 to 50% by weight of at least one vinyl monomer.

5. A process as claimed in claim 1 in which the composition comprises from 10 to 30% by weight of cross-linked polyurethane precursors and from 90 to 70% by weight of at least one vinyl monomer.

6. A process as claimed in claim 1 in which the molar ratio of groups reactive with isocyanate groups to isocyanate groups in the cross-linked polyurethane precursors is in the range 0.8:1 to 1:1.1.

7. A process as claimed in claim 6 in which the molar ratio of groups reactive with isocyanate groups to isocyanate groups in the cross-linked polyurethane precursors is in the range 0.8: to 1:1.

8. A process as claimed in claim 1 in which the cross-linked polyurethane precursors comprise an isocyanate-terminated prepolymer and at least one other component capable of cross-linking the prepolymer.

9. A process as claimed in claim 8 in which the isocyanate-terminated prepolymer is formed before the polyurethane precursors are contacted with the vinyl monomer.

10. A process as claimed in claim 1 in which the precursors of the cross-linked polyurethane are gelled and thereafter the vinyl monomer is polymerized at a temperature higher than that at which the gelation of the precursors is effected.

11. A process as claimed in claim 10 in which the precursors of the cross-linked polyurethane are gelled at a temperature at or below 30° C and the vinyl monomer is polymerized at a temperature of 40° C or higher.

12. A process as claimed in claim 11 in which the vinyl monomer is polymerized at a temperature of 50° C or higher.

13. A process as claimed in claim 1 in which the gelation of the cross-linked polyurethane precursors is effected in the presence of a catalyst therefor.

14. A process as claimed in claim 13 in which the catalyst is dibutyl tin dilaurate.

15. A process as claimed in claim 1 in which the composition contains an inhibitor for the polymerization of the vinyl monomer.

16. A process as claimed in claim 1 in which the polymerization of the vinyl monomer is effected in the presence of an initiator therefor.

17. A process as claimed in claim 16 in which the initiator is di-tertiary-butylperoxide or azobisisobutyronitrile.

18. A process as claimed in claim 1 in which the precursors of the cross linked polyurethane are chosen so as to form an elastomeric polyurethane after gelation.

19. A process as claimed in claim 18 in which the precursors of the cross-linked polymethane are of functionality such that, in theory, a cross-linked polyurethane will be found after gelation having a ratio of molecular weight of the polyurethane to branch points in the range 2,500:1 to 8,000:1.

20. A process as claimed in claim 19 in which the precursors of the cross-linked polyurethane are of functionality such that, in theory, a cross-linked polyurethane will be formed after gelation having a ratio of molecular weight of the polyurethane to branch points in the range 4,000:1 to 8,000:1.

21. A process as claimed in claim 1 in which in the composition the vinyl monomer is polyfunctional.

22. A process as claimed in claim 21 in which the composition contains at least one monofunctional vinyl monomer and at least one polyfunctional vinyl monomer.

23. A process as claimed in claim 22 in which the polyfunctional vinyl monomer is present in the composition in an amount up to 20% by weight of the monofunctional vinyl monomer.

24. A process as claimed in claim 22 in which the polyfunctional vinyl monomer is present in the composition in an amount between 1% and 5% by weight of the monofunctional vinyl monomer.

25. A process as claimed in claim 1 which comprises gelling the precursors of a cross-linked polyurethane alone, or in admixture with at least one vinyl monomer, during the gelation of the polyurethane and before the completion thereof adding at least one vinyl monomer, or adding further increments of at least one vinyl monomer, to form a homogeneous composition, thereafter substantially completing the gelation of the cross-linked polyurethane precursors before polymerization of the vinyl monomer is allowed to proceed to the extent that the vinyl polymer so produced forms a separate phase, and thereafter completing the polymerization of the vinyl monomer.

26. A process as claimed in claim 1 in which the composition is shaped by casting into a mould or by compression moulding.

27. A process as claimed in claim 1 in which the vinyl monomer is a vinyl ester, an aryl vinyl compound or a vinyl nitrile.

28. A process as claimed in claim 27 in which the vinyl monomer is methyl methacrylate or styrene.

29. A process as claimed in claim 27 in which the vinyl monomer is acrylonitrile, glycol dimethacrylate, a mixture of glycol dimethacrylate with nonyl methacrylate or methyl methacrylate, or a mixture of any two vinyl monomers selected from methyl methacrylate, styrene and acrylonitrile.

30. A process as claimed in claim 1 in which the vinyl monomer is a vinyl halide.

31. A process as claimed in claim 30 in which the vinyl halide is vinyl chloride.

32. A process as claimed in claim 1 in which the polyisocyanate is 4:4'-diphenylmethane diisocyanate.

33. A process as claimed in claim 1 in which the polyisocyanate is hexamethylene diisocyanate, isophorone diisocyanate, a mixture of hexamethylene diisocyanate and isophorone diisocyanate, or a mixture of 2:4- and 2:6-toluene diisocyanate.

34. A process as claimed in claim 1 in which the polyfunctional compound is a polyol or a polyester.

35. A process as claimed in claim 34 in which the polyfunctional compound is poly(ethylene terephthalate), trimethylol propane; a mixture of poly(propylene glycol and oxypropylated trimethylol propane; or a mixture of poly(propylene glycol) and oxypropylated trinethylol propane with either butane-1:4-diol, or poly(ethylene adipate) or di(ethylene glycol).

36. A process as claimed in claim 34 in which the polyfunctional compound is a pentaerythritol modified poly(oxyethylene adipate); a condensate of trimethylol propane, 1:2-propylene glycol and sebacic acid; oxypropylated trimethylol propane; or a mixture of oxypropylated trimethylol propane with either poly(ethylene adipate) or a mixture of poly(propylene glycol) and butane-1:4-diamine.

* * * * *